(12) United States Patent
Choi et al.

(10) Patent No.: US 12,403,466 B2
(45) Date of Patent: Sep. 2, 2025

(54) CERAMIC MICROFLUIDIC REACTOR AND MANUFACTURING METHOD THEREFOR

(71) Applicant: M.O.P Co., Ltd, Seoul (KR)

(72) Inventors: Hyung Il Choi, Pyeongtaek-Si (KR); Do Hyun Kim, Seoul (KR); Jin Ho Oh, Suwon-Si (KR)

(73) Assignee: M.O.P Co., Ltd, Seoul (KR)

( * ) Notice: Subject to any disclaimer, the term of this patent is extended or adjusted under 35 U.S.C. 154(b) by 829 days.

(21) Appl. No.: 17/675,458

(22) Filed: Feb. 18, 2022

(65) Prior Publication Data

US 2022/0168732 A1 Jun. 2, 2022

Related U.S. Application Data

(63) Continuation of application No. PCT/KR2019/010724, filed on Aug. 22, 2019.

(51) Int. Cl.
*B01L 3/00* (2006.01)
*B33Y 70/00* (2020.01)
(Continued)

(52) U.S. Cl.
CPC ......... *B01L 3/502707* (2013.01); *B33Y 70/00* (2014.12); *B33Y 80/00* (2014.12);
(Continued)

(58) Field of Classification Search
CPC .......... B01L 3/502707; B01L 2200/12; B01L 2300/0867; B01L 2300/0883;
(Continued)

(56) References Cited

U.S. PATENT DOCUMENTS

2005/0044972 A1* 3/2005 Jiang ...................... C04B 35/64
  73/866
2017/0297099 A1 10/2017 Gibson et al.
(Continued)

FOREIGN PATENT DOCUMENTS

EP 1547675 A1 6/2005
EP 2359958 A1 8/2011
(Continued)

OTHER PUBLICATIONS

"This Isn't Science Fiction! Octave Light R1 3D Printer Offers Power & Perfection, Plus Affordability", Mar. 3, 2016, https://3dprint.com/122249/octave-light-r1-3d-printer/.
(Continued)

*Primary Examiner* — Brian J. Sines
(74) *Attorney, Agent, or Firm* — Studebaker Brackett PLLC

(57) ABSTRACT

The present invention relates to a ceramic microfluidic reactor and a manufacturing method therefor. The ceramic microfluidic reactor of the present invention comprises a microfluidic channel for enabling the accommodation and movement of microfluids and may be formed of a ceramic material. According to the present invention, the ceramic microfluidic reactor is formed of a ceramic material, and thus can have high strength, hardness, and toughness unique to ceramic. Therefore, the ceramic microfluidic reactor is stable against high temperatures and high pressures and can have improved stability in terms of chemical resistance.

4 Claims, 11 Drawing Sheets

(51) Int. Cl.
  *B33Y 80/00* (2015.01)
  *C04B 35/64* (2006.01)
  *C04B 38/00* (2006.01)

(52) U.S. Cl.
  CPC .......... *C04B 35/64* (2013.01); *C04B 38/0022* (2013.01); *B01L 2200/12* (2013.01); *B01L 2300/0867* (2013.01); *B01L 2300/0883* (2013.01); *B01L 2300/12* (2013.01)

(58) Field of Classification Search
  CPC ..... B01L 2300/12; B33Y 70/00; B33Y 80/00; C04B 35/64; C04B 38/0022
  See application file for complete search history.

(56) References Cited

U.S. PATENT DOCUMENTS

| | | | |
|---|---|---|---|
| 2018/0056292 A1* | 3/2018 | Kwon | .................... C04B 35/01 |
| 2018/0162044 A1 | 6/2018 | Gibson et al. | |

FOREIGN PATENT DOCUMENTS

| | | | |
|---|---|---|---|
| JP | WO2004-009231 A1 | 11/2005 | |
| KR | 10-2016-0046699 A | 4/2016 | |
| KR | 10-2019-0034913 A | 4/2019 | |
| KR | 10-1969335 B1 | 8/2019 | |
| WO | 2018/156766 A2 | 8/2018 | |

OTHER PUBLICATIONS

Bhattacharjee, Nirveek et al., The upcoming 3D-printing revolution in microfluidics., Lab on a Chip., Apr. 4, 2016, vol. 16, pp. 1720-1742.

Schmidt, Johanna et al., "Digital light processing of ceramic components from polysiloxanes", Journal of the European Ceramic Society, Jan. 2018, vol. 38, Issue 1, pp. 57-66; https://doi.org/10.1016/j.jeurceramsoc.2017.07.033.

International Search Report issued in PCT/KR2019/010724; mailed May 15, 2020.

Office Action issued in KR 10-2019-7032828; mailed by the Korean Intellectual Property Office on Nov. 23, 2020.

Ligon S C et al., "Polymers for 3D Printing and Customized Additive Manufacturing", Chemical Reviews, vol. 117, No. 15, Jul. 30, 2017, pp. 10212-10290.

The extended European search report issued by the European Patent Office on Mar. 23, 2023, which corresponds to European Patent Application No. 19941977.1-1101 and is related to U.S. Appl. No. 17/675,458.

* cited by examiner

CERAMIC MICROFLUIDIC REACTOR AND MANUFACTURING METHOD THEREFOR

CROSS-REFERENCE TO RELATED APPLICATIONS

This application is a Continuation of International Application No. PCT/KR2019/010724, filed on Aug. 22, 2019, the disclosures of which are incorporated herein by reference in its entirety.

TECHNICAL FIELD

The present invention relates to a ceramic microfluidic reactor, and more particularly, to a ceramic microfluidic reactor and a method of manufacturing the same.

BACKGROUND ART

In general, a microfluidic reactor is a device for continuously supplying a small amount of microfluids into a microchannel with a size of tens to hundreds of micrometers, and inducing chemical reactions between the microfluids. The microfluidic reactor uses a small amount of microfluids, and thus has advantages of a shorter reaction time, fast heat transfer, a minimal diffusion distance, and minimal side reactions, and is used in various research fields ranging from biology, such as organic and inorganic syntheses, nanomaterial synthesis, the development of analysis systems using protein and DNA reactions, to nanomaterials and chemistry.

Conventional microfluidic reactors consist of a metal material. Metals have advantages of easy processing, high heat transfer, chemical resistance and mechanical stability.

Such metallic microfluidic reactors may be manufactured by mechanical processing that forms microchannels by cutting a bulk-type metal raw material.

However, since metals are opaque materials, there are disadvantages in that it is impossible to continuously observe the interior of a microfluidic reactor during specific chemical synthesis or material synthesis, and corrosion occurs by some fluids.

In addition, a metallic microfluidic reactor manufactured by mechanical processing has disadvantages of high production costs because most pieces of processing equipment are expensive, and difficult production of a microfluidic reactor having a microchannel with a complicated structure due to structural limitations of a processing machine. In addition, according to mechanical processing, a microfluidic reactor is manufactured by a method of separately processing an upper plate and a lower plate and then combining them, and thus there may be a problem of microfluid leakage caused by detachment or defects in the adhesive part of the upper and lower plates.

Accordingly, to compensate for the disadvantages of such metallic microfluidic reactors, a polymeric microfluidic reactor was developed in a form similar to a metallic microfluidic reactor.

A polymeric microfluidic reactor is a microfluidic reactor manufactured using a polymeric material such as polydimethylsiloxane (PDMS), having advantages of chemical stability, high transparency, a low price, and the possibility of mass production.

Polymeric microfluidic reactors are manufactured not only by mechanical processing or an injection process, but also by soft lithography in the case of transparent polymers such as PDMS. Soft lithography is a method of forming a soft mold or pattern by applying laser to a PDMS block.

However, a polymer such as PDMS has a disadvantage of being unstable at a high temperature and high pressure. It also has disadvantages of damage to a microfluidic reactor due to a reaction of some organic solvents included in a microfluid and PDMS, and reduced chemical stability.

In addition, in the case of a soft lithography manufacturing process, PDMS may melt by heat generated by laser and thus may be deformed, and therefore, there is a disadvantage in that it is difficult to manufacture a multi-layered microfluidic reactor.

Therefore, there is a demand for developing the technology for microfluidic reactors consisting of a material that prevents corrosion by microfluids, is stable at a high temperature and high pressure, and has excellent chemical stability.

In addition, there is a demand for developing the technology for a microfluidic reactor which is manufactured at lower production costs and has a more sophisticated structure, and a method of manufacturing a microfluidic reactor that does not have shrinkage or deformation of the structure and is able to form a microfluidic reactor manufactured integrally without distinction of upper and lower plates.

Meanwhile, the above-described background art is technical information that was possessed for the derivation of the present invention or acquired in the derivation procedure of the present invention by the inventor, and it is not necessarily known art that had been disclosed to the general public prior to the filing of the present invention.

DISCLOSURE

Technical Problem

The present invention is directed to providing a ceramic microfluidic reactor which is stable at a high temperature and high pressure, and has excellent chemical resistance and excellent corrosion resistance, and a method of manufacturing the same.

The present invention is also directed to providing a ceramic microfluidic reactor which is able to be manufactured at low cost using a photocuring 3D printer, and a method of manufacturing the same.

Technical Solution

One aspect of the present invention may provide a ceramic microfluidic reactor, which may include a microchannel capable of accommodating and moving microfluids, and consist of a ceramic material.

For example, the microchannel may be formed in a pipe shape, and have an outer wall thickness of 0.2 to 10 mm.

For example, a partition wall which is connected to the outer wall of the microchannel and disposed in a region corresponding to the edges of the ceramic microfluidic reactor may be further included.

For example, the cross-section of an inner tube of the microchannel may be formed in a parallelogram shape, and the opposite angles on the left and right sides of the parallelogram may be greater than 90°, and the opposite angles on the top and bottom sides thereof may be less than 90°.

For example, the cross-section of the inner tube of the microchannel may be formed in a rhombus shape.

For example, the cross-section of the inner tube of the microchannel may be formed in a round shape.

Another aspect of the present invention may provide a method of manufacturing a ceramic microfluidic reactor using a photocuring 3D printer, which may include: providing a ceramic slurry including surface-treated ceramic particles and a photocurable binder; forming a microfluidic reactor structure including a microchannel by curing the ceramic slurry through the application of light to a region corresponding to the outer wall of the microchannel using a photocuring 3D printer; removing a part of the photocurable binder from the microfluidic reactor structure; and sintering the microfluidic reactor structure from which a part of the photocurable binder is removed.

For example, the forming of a microfluidic reactor structure including a microchannel by curing the ceramic slurry through the application of light to a region corresponding to the outer wall of the microchannel using a photocuring 3D printer may include forming a support under the outer wall of the microchannel, and prior to the removing of a pan of the photocurable binder from the microfluidic reactor structure, may further include removing the support formed under the outer wall of the microchannel.

For example, the forming of a microfluidic reactor structure including a microchannel by curing the ceramic slurry through the application of light to a region corresponding to the outer wall of the microchannel using a photocuring 3D printer may include forming a surrounding support which surrounds the outer wall of the microchannel and is spaced apart from the outer wall of the microchannel, and prior to the removing of a part of the photocurable binder from the microfluidic reactor structure, further include removing the surrounding support.

For example, the forming of a support under the outer wall of the microchannel, and forming a surrounding support which surrounds the outer wall of the microchannel and is spaced apart from the outer wall of the microchannel may include forming the surrounding support to have a distance between the outer wall of the microchannel and the support of 0.01 to 3 mm.

For example, the forming of a microfluidic reactor structure including a microchannel by curing the ceramic slurry through the application of light to a region corresponding to the outer wall of the microchannel using a photocuring 3D printer may include (a) providing a ceramic slurry in a layer to a main stage of the photocuring 3D printer using a layer-forming unit of the photocuring 3D printer, (b) forming a layer of the microfluidic reactor structure by curing the layer of ceramic slurry using a light source, and (c) repeating (a) and (b) until the microfluidic reactor structure is formed.

For example, (b) the forming of a layer of the microfluidic reactor structure by curing the layer of ceramic slurry using a light source may include forming a layer such that an angle between the ground and the line connecting the lower vertex of one layer and the lower vertex of another layer formed thereon is 45° or more.

Advantageous Effects

According to one embodiment of the present invention, a ceramic microfluidic reactor of the present invention is formed of a ceramic material, and thus can have high strength, hardness and toughness, which are the characteristics of ceramics. Here, the ceramic microfluidic reactor can be stable at a high temperature and high pressure, and improved in chemical stability.

According to one embodiment of the present invention, a ceramic microfluidic reactor of the present invention and a method of manufacturing the same do not need to manufacture a separate mold because a photocuring 3D printer is used, there is an advantage in that a microfluidic reactor with a complicated microchannel can be rapidly manufactured at low cost.

In addition, according to one embodiment of the present invention, a ceramic microfluidic reactor of the present invention and a method of manufacturing the same employs a photocuring 3D printer, so cracks which may be generated in a conventional mechanical processing method can be reduced, and thus a structure with a more sophisticated shape can be easily printed.

In addition, according to one embodiment of the present invention, a ceramic microfluidic reactor of the present invention and a method of manufacturing the same can minimize the deformation of a microchannel, which may occur in the lamination procedure during photocuring 3D printing, and print the microfluidic reactor structure with excellent precision.

In addition, according to one embodiment of the present invention, a ceramic microfluidic reactor of the present invention and a method of manufacturing the same can prevent drooping that may occur when layers of ceramic slurry are laminated by forming both of a lower support and a surrounding support at the outer wall of a microchannel during photocuring 3D printing, and thus a structure that has a uniform interior and has a sophisticated shape can be formed.

MODES OF THE INVENTION

Figure 1:
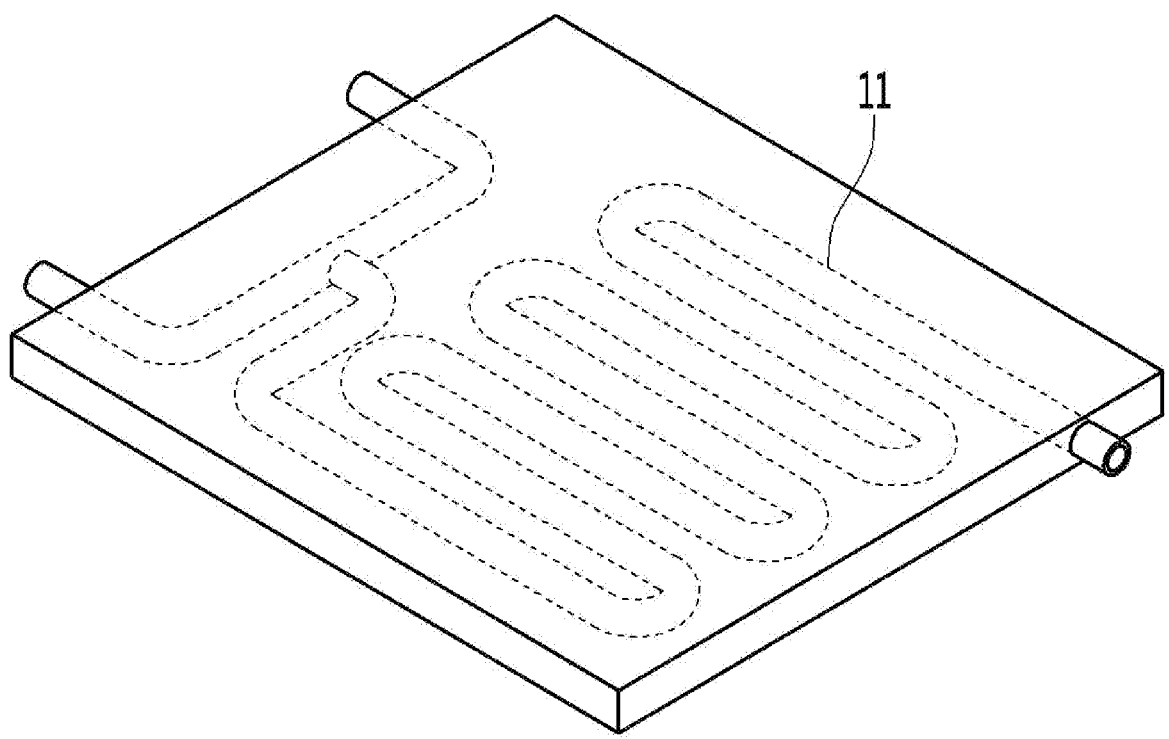
FIG. 1 shows a ceramic microfluidic reactor according to one embodiment of the present invention.

Hereinafter, to describe the technical idea of the present invention in detail so as to be easily implemented by those of ordinary skill in the art to which the present invention belongs, the most preferable embodiment will be described with reference to the accompanying drawings. First, it should be noted that, when reference numerals are assigned to components of each drawing, like components are denoted by the same reference numerals, even if they are represented in different drawings. In addition, in description of embodiments of the present invention, detailed descriptions of known configurations or functions related thereto will be omitted when it is determined that the detailed descriptions would hinder the understanding of embodiments of the present invention.

Hereinafter, a ceramic microfluidic reactor according to one embodiment of the present invention will be described in detail with reference to the accompanying drawings as follows.

FIG. 1 shows a ceramic microfluidic reactor 10 according to one embodiment of the present invention.

The ceramic microfluidic reactor 10 according to one embodiment of the present invention may be a device that introduces microfluids and induces a chemical reaction between the introduced microfluids.

Referring to FIG. 1, the ceramic microfluidic reactor 10 according to one embodiment of the present invention may include a microchannel 11 capable of accommodating and moving microfluids, and may consist of a ceramic material.

The microchannel 11 may accommodate microfluids introduced from the outside, and move the accommodated microfluids. That is, the microchannel 11 serves as a channel through which microfluids are introduced and flow.

The microchannel 11 is formed in a pipe shape so that microfluids can flow in and out. That is, the microchannel 11 may be formed in a pipe shape extending from an inlet to an outlet. The microchannel 11 may be folded or bent and extend in a meandering shape in order to move microfluids. For example, the microchannel 11 may extend in a linear, zig-zag, oblique or curved shape.

A plurality of the microchannels 11 may be formed such that at least two microfluids can be introduced therethrough. For example, as shown in FIG. 1, there may be two microchannels 11 respectively accommodating different microfluids introduced from the ceramic microfluidic reactor 10. In this case, two microchannels 11 may be combined in one pipe so that different microfluids can be mixed and moved in a mixed state. In addition, to separate the mixed microfluids, the pipe-shaped microchannel 11 may be divided again into a plurality of microchannels 11. In addition, the microchannels 11 may be, as shown in FIG. 1, included in a main body of the ceramic microfluidic reactor 10. However, the present invention is not limited thereto, and the microfluidic reactor 10 may not include a main body, and the microchannel 11 may be formed in a pipe shape, so that the microchannel 11 itself may constitute the microfluidic reactor 10.

The cross-section of the inner tube of the microchannel 11 of the microfluidic reactor 10 according to the present invention may be formed in a round shape. However, the present invention is not limited thereto, and the cross-section of the microchannel 11 of the microfluidic reactor 10 may be formed in parallelogram shape in which the opposite angles on the left and right sides are more than 90°. In addition, the cross-section of the interior of the microchannel 11 of the microfluidic reactor 10 may be formed in a rhombus shape. Details of the cross-sectional shape of the microchannel 11 will be described with reference to FIGS. 4A to 4B as below.

When the microchannel 11 has a round cross-section, the cross-section of the microchannel 11 may have a diameter in micrometers. For example, the diameter of the microchannel 11 may be 50 μm or more, and 1,000 μm or less. Meanwhile, when the cross-section of the microchannel 11 is formed in a parallelogram or rhombus shape, the size of the cross-section of the microchannel 11 may be 50 μm or more, and 1,000 μm or less. Here, the size of the cross-section of the microchannel 11 may be defined as the length of a long side among the sides passing through the center of gravity of the parallelogram or rhombus, and connecting vertices facing each other.

In some embodiments, the diameter of the microchannel 11 may vary according to a section of the microchannel 11 included in the ceramic microfluidic reactor 10. For example, the diameter of the microchannel 11 in the part of which is branched to the left and right such that different microfluids flow therethrough may be wider than that of a microchannel 11 through which the mixture of different microfluids flows. However, the size of the diameter of the microchannel 11 is not limited thereto, and the sizes of the diameters of the branched part and connecting part of the microchannel 11 may be the same. In this case, by adjusting the width of the microchannel 11, a microfluid movement rate in the microchannel 11 may be controlled.

The microchannel 11 may be formed of a ceramic. Ceramics mean non-metallic or inorganic materials process-molded at a high temperature, and representatively, consist of an oxide, a carbide or a nitride made by bonding an element such as silicon (Si), aluminum (Al), titanium (Ti) or zirconium (Zr) with oxygen, carbon or nitrogen, respectively.

Ceramics used for forming the microchannel 11 may consist of alumina ($Al_2O_3$), zirconia ($ZrO_2$), titania ($TiO_2$), or silica ($SiO_2$). However, the material of microchannel 11 may include, but is not limited to, all components for manufacturing a conventional microchannel 11, and may vary according to the use of the ceramic microfluidic reactor 10.

In addition, the microchannel 11 may be manufactured of a transparent ceramic. Although there are many common ceramics that are opaque and do not allow visible light to pass through, some ceramics can transmit light like glass depending on manufacturing conditions. Transparent ceramics may be prepared by inhibiting defects that become the cause of scattering, such as impurities or bubbles, using an isotropic crystal structure without optical anisotropy. Transparent ceramics may include, for example, Mg—Al spinel ($MgAl_2O_4$), AlON, yttrium aluminum garnet, yttrium oxide, zirconium oxide and yttria.

Since the ceramic microfluidic reactor 10 according to one embodiment of the present invention is formed of a ceramic material, it has high strength, hardness and toughness, which are the characteristics of ceramics. In addition, the ceramic microfluidic reactor 10 may be stable at a high temperature and high pressure, and have excellent chemical resistance and corrosion resistance.

The ceramic microfluidic reactor 10 according to one embodiment of the present invention is manufactured by photocuring 3D printing. 3D printing is a manufacturing method using a machine capable of automatically printing a 3D microfluidic reactor structure based on a 3D drawing. 3D printing includes cutting-type 3D printing that forms a microfluidic reactor structure by carving raw materials and layered 3D printing that forms a microfluidic reactor structure by layering a material layer by layer.

Layered 3D printing includes a fused deposition modeling (FDM) method that forms a microfluidic reactor structure by melting a material and spraying the melted material with a nozzle, a selective laser sintering (SLS) method that forms a microfluidic reactor structure by applying laser to a powdery material to melt and then harden a part of the material, a digital light processing (DLP) method that forms a microfluidic reactor structure by applying surface unit light to a liquid-state photocurable material to cure the photocurable material, and a stereo lithography apparatus (SLA) method that cures a photocurable material using laser applying point unit light to the photocurable material.

The method of manufacturing the ceramic microfluidic reactor 10 according to one embodiment of the present invention may be performed by photocuring 3D printing among various 3D printing methods, for example, DLP or SLA. The present specification will be described based on DLP, which is one of the photocuring 3D printing methods. The DLP-type 3D printing may be classified into bottom-up and top-down types according to the light application direction.

The bottom-up type DLP may form a ceramic microfluidic reactor structure by immersing a molding stage in a water tank containing a liquid ceramic slurry and applying light from the bottom to the top. A method of manufacturing the ceramic microfluidic reactor 10 using the bottom-up type DLP will be described with reference to FIGS. 2, 3A to 3C below.

The top-down type DLP is a method of forming a ceramic microfluidic reactor structure by providing a layer of liquid ceramic slurry on a main stage by a layer-forming unit, forming one layer of a structure by applying light, and laminating a plurality of layers in the same manner as described above. The method of manufacturing the ceramic microfluidic reactor 10 using the top-down type DLP will be described with reference to FIGS. 2, 5A to 5D below.

Meanwhile, since the photocuring 3D printing forms a ceramic microfluidic reactor structure by a photocuring method, rather than a nozzle spraying method, it is possible to form a microfluidic reactor structure with a sophisticated structure, compared to FDM-type 3D printing. In addition, since the photocuring 3D printing forms a microfluidic reactor structure using a liquid material, it has advantages of being more environmentally friendly and free from a risk of explosion that may occur due to powder scattering, compared to SLS-type 3D printing using a powdery material.

Hereinafter, referring to FIGS. 2, 3A to 3C, a method of manufacturing a ceramic microfluidic reactor using a photocuring 3D printer will be described.

Figure 2:
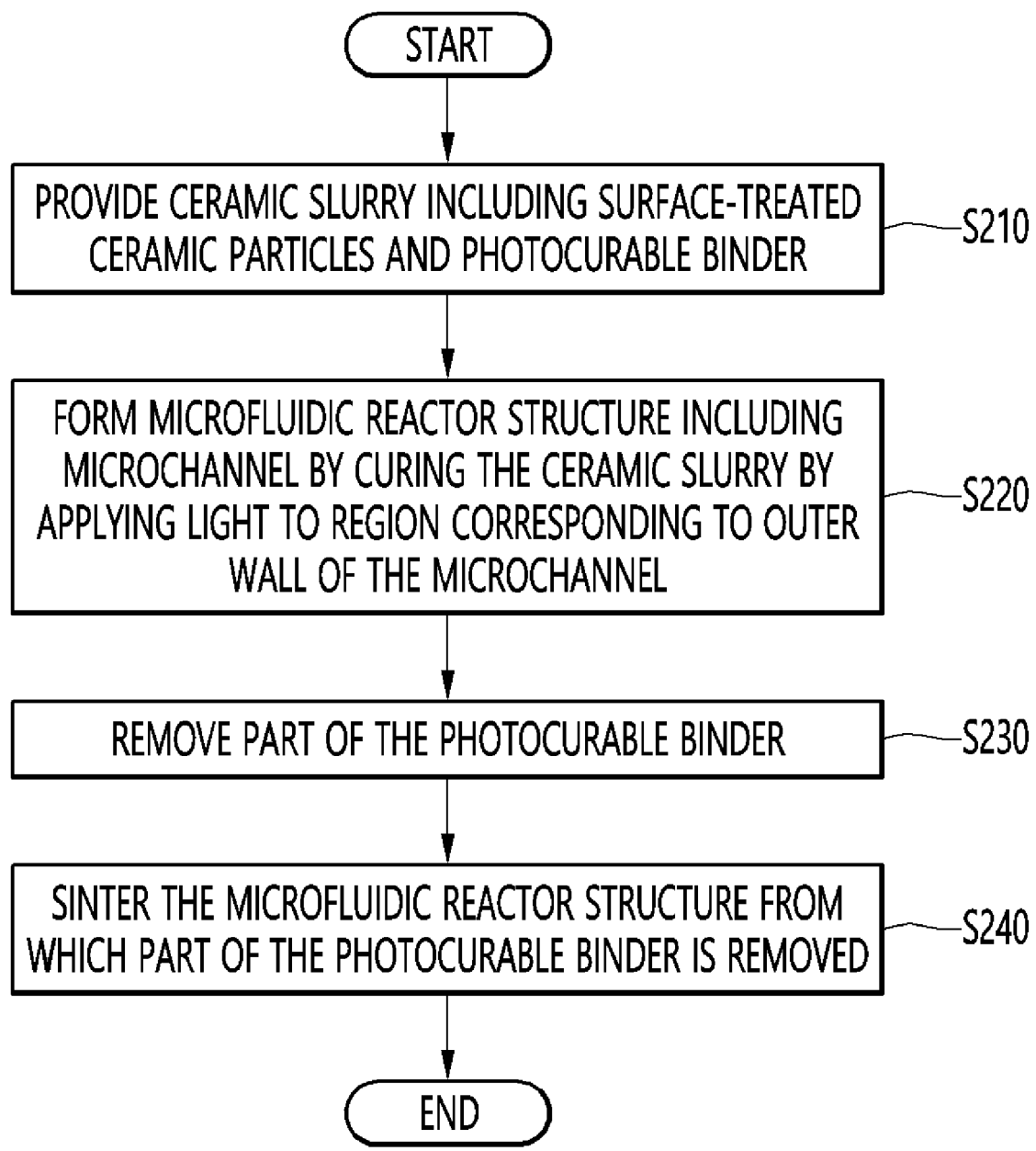
FIG. 2 is a flowchart illustrating a method of manufacturing a ceramic microfluidic reactor using a photocuring 3D printer according to one embodiment of the present invention.
Figure 3A:
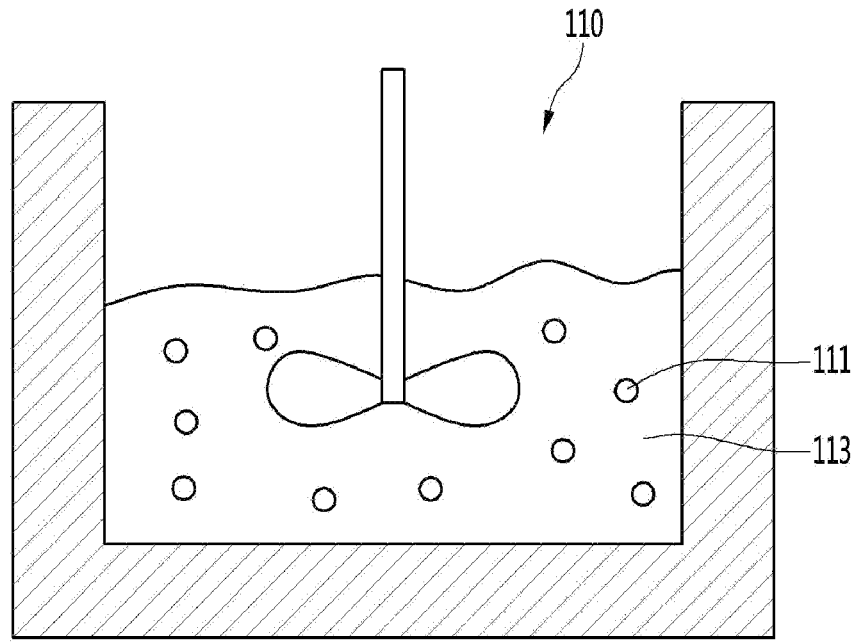
FIGS. 3A to 3C are cross-sectional views illustrating an example of the method of manufacturing a ceramic microfluidic reactor using a photocuring 3D printer of FIG. 2.
Figure 3B:
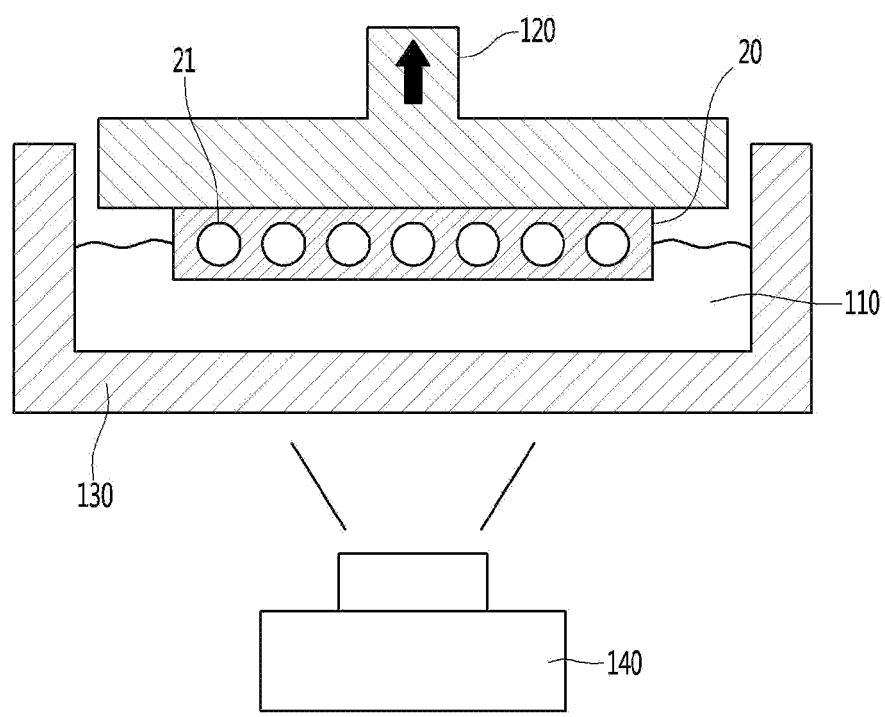
Figure 3C:
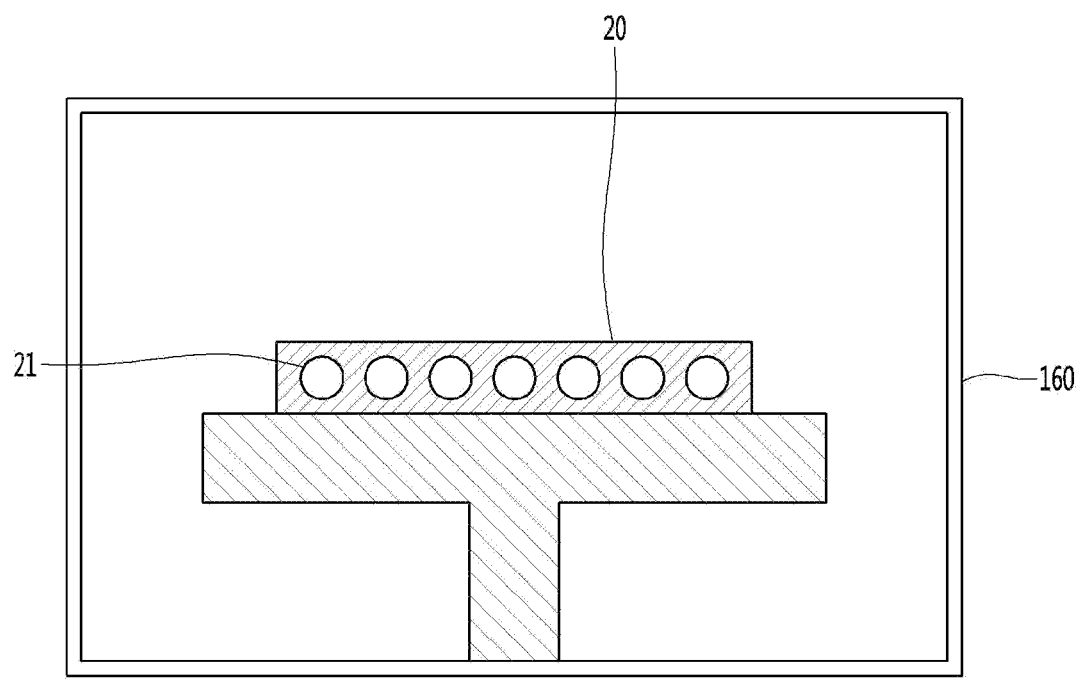

FIG. 2 is a flowchart illustrating a method of manufacturing a ceramic microfluidic reactor using a photocuring 3D printer according to one embodiment of the present invention. FIGS. 3A to 3C are cross-sectional views illustrating an example of the method of manufacturing a ceramic microfluidic reactor using a photocuring 3D printer of FIG. 2.

Referring to FIG. 2, a ceramic slurry including surface-treated ceramic particles and a photocurable binder is provided (S210).

The ceramic slurry may be provided to a water tank to print a ceramic microfluidic reactor structure. Here, the water tank may be a transparent or semi-transparent vessel. Here, the amount of the ceramic slurry provided to the water tank may be larger than the total height of the formed ceramic microfluidic reactor structure by applying light to the water tank. That is, the amount of the ceramic slurry provided to the water tank may be suitably provided such that lamination can be sufficiently performed in the water tank during 3D printing to form a ceramic microfluidic reactor structure.

Referring to FIG. 3A, a ceramic slurry 110 includes surface-treated ceramic particles 111 and a photocurable binder 113.

The ceramic slurry 110 may have a suitable viscosity for photocuring 3D printing. Specifically, the viscosity of the ceramic slurry 110 may be 100 to 30,000 cp. When the viscosity of the ceramic slurry 110 is included in the above-described range, the surface of the ceramic slurry 110 may be maintained flat during photocuring 3D printing. When the viscosity of the ceramic slurry 110 is more than 30,000 cp, it is too high to laminate layers in the process of printing a ceramic microfluidic reactor structure, and the precision of the printed ceramic microfluidic reactor structure may be reduced.

The ceramic particles 111 may consist of at least one of alumina ($Al_2O_3$), zirconia ($ZrO_2$), titania ($TiO_2$), and silica ($SiO_2$), and may be surface-treated with a surface treatment agent.

The surface treatment agent is bonded to the surface of the ceramic particle 111, and includes a functional group capable of reacting with the photocurable binder 113 during 3D printing. In one embodiment, the surface treatment agent may be a silane coupling agent represented by Formula 1 below.

[Formula 1]

Here, R may include at least one of a vinyl group, an epoxy group, an amino group, a methacryloxy group and a thiol group, and X may include at least one of a methoxy group, an ethoxy group, a dialkoxy group and a trialkoxy group. In this case, the X group may be bonded with a ceramic particle, and the R group may react with the photocurable binder 113 during 3D printing, thereby forming a polymer matrix.

The silane coupling agent having the above-described characteristics may be, for example, vinyltrimethoxysilane, vinyltriethoxysilane, 3-glycidoxypropyl trimethoysilane, 3-glycidoxypropyl methyldiethoxysilane, styryltrimethoxysilane, 3-methacryloxopropyl trimethoxysilane, 3-methacryloxypropyl triethoxysilane, or 3-acryloxypropyl trimethoxysilane.

When the ceramic particles 111 is surface-treated with the above-described silane coupling agent, the surface-treated ceramic particles 111 have reaction sites such as a vinyl group, an acrylate group and an epoxy group. In this case, the surface-treated ceramic particles 111 may be directly bonded with the photocurable binder 113 during 3D printing, and an adhesive strength between the ceramic particles 111 may be improved.

The surface treatment of the ceramic particles 111 may be performed by dispersing the ceramic particles 111 in a solvent, adjusting the acidity and temperature of a solution in which the ceramic particles 111 and the solvent are mixed to induce a reaction between a surface treatment agent and the ceramic particles 111, treating the surface of the ceramic particles 111 by adding a surface treatment agent and neutralizing the solution, and removing the solvent. For example, the surface treatment of the ceramic particles 111 may be performed in a basic environment of pH of higher than 7 and an environment at 50° C. or more. When the atmospheric conditions of the solution include a basic environment of pH of higher than 7 and an environment of 50° C. or more, the bonding between the surface treatment agent and the ceramic particles 111 may more easily occur, and the surface treatment quality of the ceramic particles 111 may be further improved. Meanwhile, the solution for forming the surface-treated ceramic particles 111 may be dried at a temperature of 50° C. or more for 24 hours or more.

Since the surface-treated ceramic particles 111 have functional groups friendly to an organic material on the surface thereof, the particles are dispersed uniformly in the liquid photocurable binder 113, and the dispersed state may be maintained for a long period of time without forming a precipitate.

As shown in FIG. 3A, the surface-treated ceramic particles 111 are mixed with the liquid photocurable binder 113.

The photocurable binder 113 is an organic material that forms a polymer matrix by a photopolymerization reaction, and may include at least one functional group of an acrylate, a methacrylate, a glycidyl ether, an epoxy, a vinyl ether, and styrene.

According to some embodiments, the photocurable binder 113 may further include various additives. For example, the photocurable binder 113 may further include a leveling agent, an UV stabilizer, a UV absorbing agent, an antioxidant, an adhesion enhancer, a low shrinkage agent, a polishing agent, a defoaming agent, a dispersing agent, a pigment, a wetting agent, a thickening agent, and a water repellent.

Referring back to FIG. 2, a microfluidic reactor structure including a microchannel is formed by curing a ceramic slurry by applying light to a region corresponding to the outer wall of the microchannel using a photocuring 3D printer (S220).

Referring to FIG. 3B, the light applied from a light source 140 may reach the ceramic slurry 110 through a transparent water tank, the photocurable binder 113 of the ceramic slurry 110 may be cured, thereby forming a microfluidic reactor structure 20.

In this case, as light may be applied only to a region corresponding to one layer of the microfluidic reactor structure 20, and the photocurable binder 113 may be cured only at the light-applied part, a layer of the microfluidic reactor structure 20 is formed by the cured binder.

The light source 140 may be configured to apply light with at least one of the wavelength bands of UV light, IR light and visible light. The light source 140 applying the light in the above-described wavelength band may consist of a laser applying point unit light or a DLP projector applying surface unit light through projection. For example, the light source 140 may consist of a DLP projector applying UV light with a wavelength of 380 to 405 mm from the bottom to the top.

When the layer of the microfluidic reactor structure 20 is formed, a stage 120 moves upwards, the light source 140 applies light to a region corresponding to the bottom of the layer, thereby forming an underlying layer of the microfluidic reactor structure 20. In the same manner as described above, light is sequentially applied by the light source 140, and the stage 120 moves upwards according to a layer-forming rate. According to this method, layers of the microfluidic reactor structure 20 are formed sequentially from the top to the bottom. Therefore, the microfluidic reactor structure 20 may be completed by the above-described method.

Referring to FIG. 2, a part of the polymer prepared by curing the photocurable binder is removed from the microfluidic reactor structure (S230).

The microfluidic reactor structure printed by photocuring 3D printing may include a polymer prepared by curing ceramic particles and the photocurable binder. In the method of manufacturing a ceramic microfluidic reactor according to one embodiment of the present invention, to manufacture a pure ceramic microfluidic reactor structure, a part of the polymer may be removed from the microfluidic reactor structure printed by photocuring 3D printing. Here, the partial removal of the polymer may be performed by exposing the microfluidic reactor structure to a high temperature environment. Specifically, the microfluidic reactor structure may be inserted into a chamber, and exposed to a temperature higher than the polymer removal temperature for one hour or longer, thereby removing the polymer in the microfluidic reactor structure.

The process of removing a part of the polymer may be a process performed at a temperature at which the shape of the microfluidic reactor structure does not collapse and a backbone polymer is left. Here, the polymer removal temperature is a temperature at which a polymer may be burned or be decomposed, and may be suitably selected according to the type of component constituting the photocurable binder. For example, the polymer removal temperature may be selected as a temperature most efficiently removing the polymer in the range of 100 to 1000° C.

When a sintering process is performed without a process of removing a part of the polymer from the microfluidic reactor structure printed by photocuring 3D printing, the polymer cured between the ceramic particles may be removed atone time. In this case, in the microfluidic reactor structure, ceramic grains may not be properly grown during the sintering process, and the microfluidic reactor may have a defect due to a crack generated at the grain boundary of the ceramic particles.

Therefore, in the method of manufacturing a ceramic microfluidic reactor according to the present invention, to prevent the shape of the microfluidic reactor structure from collapsing, a part of the polymer may be removed from the microfluidic reactor structure printed by photocuring 3D printing. Meanwhile, the backbone polymer of the microfluidic reactor structure may be completely removed during the sintering process following the polymer removal.

Referring to FIG. 2, the microfluidic reactor structure from which a part of the polymer formed by curing the photocurable binder is sintered (S240).

Referring to FIG. 3C, sintering may be performed on the microfluidic reactor structure 20 by putting the microfluidic reactor structure 20 into a chamber 160, and exposing the microfluidic reactor structure 20 to a sintering temperature. Here, sintering may be performed for a sufficient amount of time. For example, sintering may be performed for 24 hours or more, and the sintering temperature may be selected in the range of 500 to 2000° C.

The sintering process may consist of a temperature raising step and a cooling step. The temperature raising step may be a procedure of increasing the temperature of the chamber 160 from room temperature to the sintering temperature. For example, the temperature raising process of the present invention may be performed by increasing the temperature of the chamber 160 including the microfluidic reactor structure 20 from room temperature to 500° C., maintaining the temperature at 500° C. for a predetermined time, increasing the temperature to the predetermined temperature of 1000° C., maintaining the temperature for a predetermined time, which is repeated until the temperature reaches the maximum sintering temperature of 2000° C.

The cooling step may be a procedure of cooling the temperature of the chamber 160 increased in the temperature raising step. The cooling step may be performed by, in the same manner as in the temperature raising step, cooling the temperature in the chamber 160 for a predetermined time, and maintaining the cooled temperature for a predetermined time.

However, the sintering process is not limited to the above examples, and may be performed by rapidly increasing or decreasing the temperature in the chamber 160.

A dense and pure ceramic microfluidic reactor structure 20 may be provided by completely growing ceramic grains by sintering the ceramic particles 111 according to the sintering process. In addition, through sintering of the ceramic microfluidic reactor structure 20, the ceramic particles 111 may be crystallized, and thus a ceramic microfluidic reactor having excellent strength, hardness and toughness may be manufactured.

In some embodiments, the procedure of removing a part of the polymer from the microfluidic reactor structure 20 and the procedure of performing sintering on the microfluidic reactor structure 20 may be performed in separately optimized chambers.

As described above, by using the photocuring 3D printer, the ceramic microfluidic reactor of the present invention may reduce the possibility of defects generated in the conventional method of manufacturing a microfluidic reactor through mechanical processing, solve the problem of microfluid leakage, and more easily form a structure with a more precise shape.

Specifically, the manufacture of a microfluidic reactor through mechanical processing may be performed by processing the microfluidic reactor by dividing it into an upper plate and a lower plate and combining them. However, when the upper and lower plates of the microfluidic reactor are not well adhered, the adhesion of the upper and lower plates may be degraded or a defect may occur, and thus a microfluid may leak.

On the other hand, as the ceramic microfluidic reactor according to one embodiment of the present invention may use photocuring 3D printing, rather than mechanical processing, the microfluidic reactor structure 20 is formed such that the upper and lower plates are integrated without distinction between the upper and lower plates, and it is possible to solve the problems of microfluid removal and microfluid leakage.

In addition, as the ceramic microfluidic reactor according to one embodiment of the present invention uses photocuring 3D printer, it is possible to reduce the possibility of crack generation, and easily print a microfluidic reactor structure 20 with more precise shape, compared to the conventional method of manufacturing a microfluidic reactor by injection molding.

Specifically, the microfluidic reactor manufactured by injection molding may be formed by injecting a slurry into a mold corresponding to the shape of a microfluidic reactor structure and solidifying the slurry, separating the structure, and performing debinding and sintering. However, during debinding and sintering, shrinkage of the structure may occur, and during separation of the molded microfluidic reactor structure from a mold, cracks may be generated. In addition, when the microfluidic reactor has a microchannel with a complicated structure, a mold corresponding to the microchannel with a complicated structure has to be separately manufactured, and thus excessive costs may be needed for manufacturing the mold, and whenever the design of the microchannel is changed, there are inconvenience and inefficiency in that separate molds have to be manufactured.

On the other hand, as the ceramic microfluidic reactor 20 according to one embodiment of the present invention is manufactured using photocuring 3D printing, rather than injection molding, there is no need for separate mold production, the cost for manufacturing a mold may be reduced, and a microfluidic reactor having a complicated microchannel 21 may be rapidly manufactured at low cost.

In addition, soft lithography is a method of cutting PDMS itself using laser, and has to use high energy laser equipment. The high energy laser equipment is generally expensive, and the problem of deformation of the microchannel may be caused by laser energy during processing. On the other hand, the method of manufacturing a ceramic microfluidic reactor according to one embodiment of the present invention uses photocuring 3D printing technology. Since the photocuring 3D printing technology uses light with energy sufficient for inducing photopolymerization of the photocurable binder 113, it may use a relatively less expensive light source than a high energy laser of soft lithography, and may minimize the problem of the deformation of the microchannel 21 caused by the high energy laser.

Meanwhile, as the method of manufacturing a ceramic microfluidic reactor according to one embodiment of the present invention may use the surface-treated ceramic particles 111, the uniformity of the ceramic particles 111 may be maintained in the ceramic slurry 110 for a long period of time. In this case, during photocuring, the ceramic particles 111 may be present between the cured polymer at a uniform density. Subsequently, during the process of removing the polymers and the sintering process, since the polymers may completely disappear, and the ceramic particles 111 uniformly dispersed between the polymer may be properly bonded, a ceramic microfluidic reactor having uniform and dense grains may be formed. Therefore, the microfluidic reactor may have excellent strength, chemical resistance and corrosion resistance, which are the characteristics of ceramics.

Figure 4A:
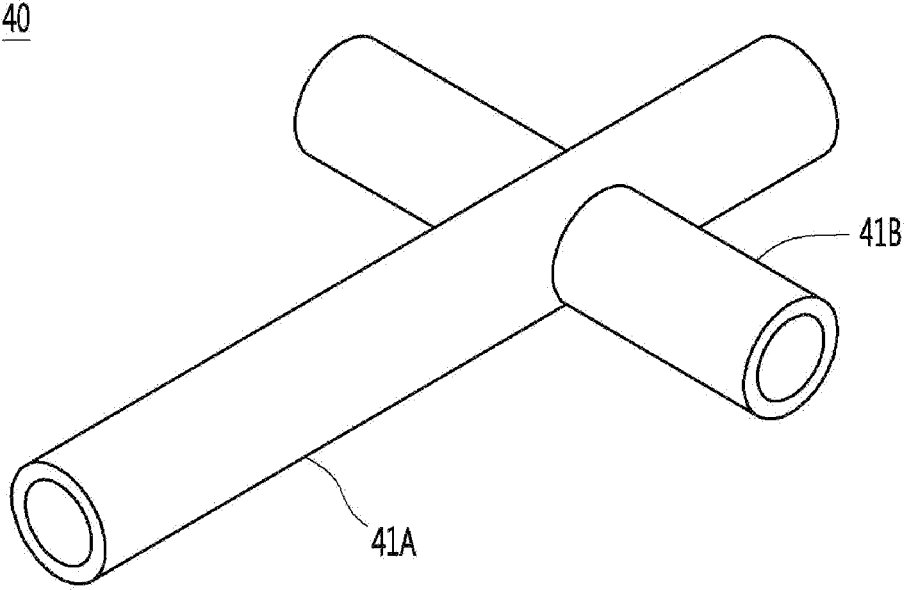
FIGS. 4A and 4B show ceramic microfluidic reactors according to another embodiment of the present invention.
Figure 4B:
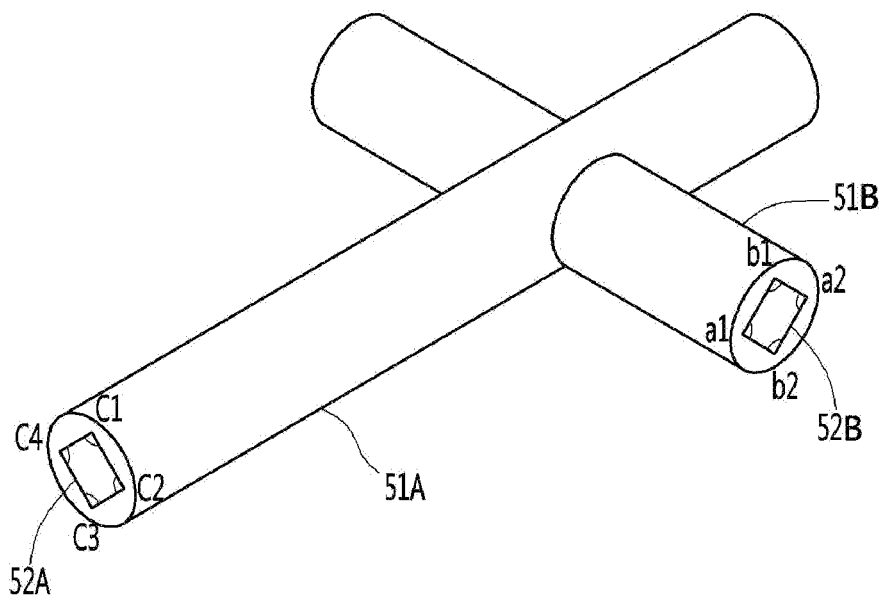

FIGS. 4A and 4B show ceramic microfluidic reactors 40 and 50 according to another embodiment of the present invention.

Referring to FIGS. 4A and 4B, microchannels 41A and 41B or 51A and 51B of the microfluidic reactors 40 or 50 may be formed in a pipe shape. Each of the microchannels 41A and 41B or 51A and 51B may include an inner tube accommodating and allowing a microfluid to flow and an outer wall surrounding the inner tube.

As described above, the microchannels 41A and 41B or 51A and 51B may be connected with each other or branched. For example, the microchannel 41A or 51A extending in one direction may be connected with the microchannel 41B or 51B extending in a different direction. In this case, the microchannels 41A and 51A may be configured to cross the microchannels 41B and 51B, respectively.

When the microchannels 41A, 41B, 51A and 51B are formed in a pipe shape, the thickness of the outer wall of each microchannel 41A, 41B, 51A or 51B refers to a distance between the outer surface and the inner surface of the outer wall of each microchannel 41A, 41B, 51A or 51B. Meanwhile, when the cross-section of the outer surface and the cross-section of the inner surface of the outer wall are formed in different shapes (e.g., the microchannels 51A and 51B shown in FIG. 4B), the thickness of the outer wall means the shortest distance between the outer surface and the inner surface of the outer wall.

The thickness of the outer wall of each of the microchannels 41A, 41B, 51A and 51B may be 0.2 to 10 mm. When the thickness of the outer wall of the microfluidic reactor 40 or 50 is 0.2 mm or less, it is too small and thus there may be a defect in the outer wall due to process errors in printing, and the microfluidic reactor 40 or 50 may not be formed because the outer wall cannot withstand external pressure. In addition, when the thickness of the outer wall of the microfluidic reactor 40 or 50 is more than 10 mm, in the process of removing the polymer or the sintering process, excessive shrinkage may occur, and cracks may be generated in the printed microfluidic reactor 40 or 50. However, the thickness of the outer wall of the microchannel 41A, 41B, 51A or 51B is not limited thereto, and since the thickness of the outer wall of the microchannel 41A, 41B, 51A or 51B is higher than the diameter of the inner tube, it may be appropriately set to have durability that can sufficiently withstand the internal pressure and external pressure, which are generated by a microfluid.

As shown in FIG. 4A, the cross-section of the inner tube of the microchannel 41A or 41B of the microfluidic reactor 40 according to the present invention may be formed in a round shape. However, as shown in FIG. 4B, the cross-section of the inner tube of the microchannel 51B may be formed in a parallelogram 52B shape in which the opposite angles on the left and right sides are more than 90°, but the present invention is not limited thereto. In addition, as shown in FIG. 4B, the cross-section of the inner tube of the microchannel 51A of the microfluidic reactor 50 may be formed in a rhombus shape 52A.

Referring to FIG. 4A, when the cross-section of the inner tube of the microchannel 41A or 41B is formed in a round shape, the round shape may be located concentrically inside the outer wall of the microchannel 41A or 41B, and may be located on the left or right side in the outer wall. When the cross-section of the inner tube of the microchannel 41A or 41B is formed in a round shape, edges of the inner tube are minimized, and thus the possibility of cracks may be lowered because stress concentration does not occur.

Referring to FIG. 4B, when the cross-section of the inner tube of the microchannel 51A or 51B is formed in a parallelogram shape 52B, the opposite angles on the left side a1 and the right side a2 of the parallelogram 52B may be more than 90°, and the opposite angles of the top b1 and the bottom b2 may be less than 90°.

Referring to FIG. 4B, when the cross-section of the inner tube of the microchannel 51A is formed in a rhombus shape 52A, the sizes of each of the four angles of the rhombus shape 52A may be 90°. Specifically, each of the angles on the top c1, the right side c2, the bottom c3 and the left side c4 of the rhombus shape 52A may be 90°.

As described above, when the microfluidic reactor 40 or 50 consists of pipe-shaped microchannels 41A and 41B or 51A and 51B, rather than including the microchannels in the body, the amount of a material required to form the body of the microfluidic reactor 40 or 50 may be reduced. That is, since the microfluidic reactor 40 or 50 does not have a hexahedral body and consists of pipe-shaped microchannels 41A and 41B or 51A and 51B, a material required to form the body may be reduced. Therefore, according to the ceramic microfluidic reactor of the present invention and the manufacturing method thereof, the microfluidic reactor 40 or 50 may be manufactured at low cost.

Particularly, since it is very difficult to manufacture the pipe-shaped microchannels 41A, 41B, 51A and 51B by mechanical processing, injection molding and soft lithography, the method of manufacturing the microfluidic reactor 40 or 50 using photocuring 3D printing according to one embodiment of the present invention may be more easily applied.

In addition, when the shape of the cross-section of the inner tube of the microfluidic reactor 50 is a parallelogram 52B or a rhombus 52A, during photocuring 3D printing, a drooping phenomenon that can occur in the procedure of forming layers of the microfluidic reactor 50 may be minimized, the microfluidic reactor 50 may have microchannels 51A and 51B with a sophisticated shape. Referring to FIGS. 5A to 5D, the drooping phenomenon of the laminated structure that can occur in the procedure of top-down photocuring 3D printing and its improvement method will be described in detail.

FIGS. 5A to 5D are cross-sectional views illustrating a method of manufacturing a ceramic microfluidic reactor using a photocuring 3D printer according to another embodiment of the present invention.

Figure 5A:
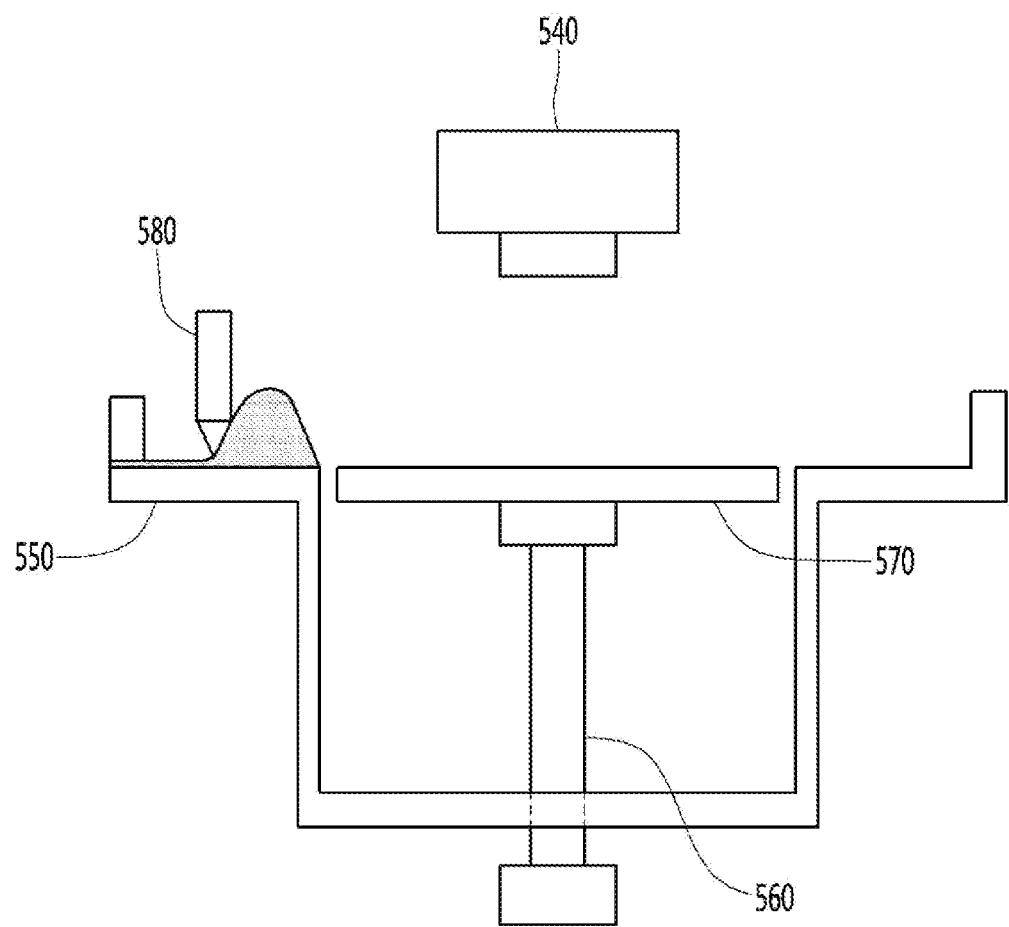
FIGS. 5A to 5D are cross-sectional views illustrating a method of manufacturing a ceramic microfluidic reactor using a photocuring 3D printer according to another embodiment of the present invention.

Referring to FIG. 5A, according to the method of manufacturing a ceramic microfluidic reactor using a photocuring 3D printer, a ceramic slurry including surface-treated ceramic particles and a photocurable binder may be provided on an auxiliary stage 550.

Referring to FIG. 5A, the ceramic slurry may be provided on the auxiliary stage 550 at a predetermined amount, and it may be provided in a layer on a molding stage 570 of a main stage 560 by a layer-forming unit 580. Here, since the structure can be printed with a small amount of ceramic slurry, the efficiency of using the ceramic slurry may increase.

Meanwhile, the ceramic slurry may have a viscosity of 5,000 to 100,000 cp. When the ceramic slurry has the above-described range of viscosity, the ceramic slurry may not flow down, and may be sufficiently stacked on the auxiliary stage 550.

Referring to FIG. 5A, the auxiliary stage 550 may provide a space in which the ceramic slurry is provided.

The auxiliary stage 550 may be formed in a water tank shape surrounding the main stage 560. The auxiliary stage 550 may not ascend or descend, and when the main stage 560 ascends to the highest height, the top surface of the auxiliary stage 550 may be fixed to be located at the same level as the top surface of the molding stage 570 of the main stage 560.

The auxiliary stage 550 may include an outer wall surrounding edges of the auxiliary stage 550 so the ceramic slurry does not flow out of the auxiliary stage 550. However, the present invention is not limited thereto, and when the area of the auxiliary stage 550 is sufficiently large and thus the problem of the ceramic slurry flowing out of the auxiliary stage 550 rarely occurs, the outer wall of the auxiliary stage 550 may be omitted.

The main stage 560 may include a molding stage 570 configured to provide a space for printing a structure and support the printed structure. The main stage 560 may raise or lower the molding stage 570.

The molding stage 570 may provide a space for forming a structure, and may be formed in a plate shape that can support the structure. The molding stage 570 may have an area which is larger than or the same as the area of the bottom surface of the finally printed structure. As the molding stage 570 is raised or lowered by the main stage 560, layers of the structure may be sequentially laminated on the molding stage 570, and the structure may be printed by the laminated layers.

A light source 540 may apply light on the molding stage 570 to cure the ceramic slurry on the molding stage 570. As described above, the light source 540 may be located above the molding stage 570 and configured to apply light with at least one of the wavelength bands of UV light, IR light and visible light. The light source 540 applying light with the above-described wavelength band may be a laser that applies point unit light or a DLP projector that applies surface unit light through projection.

The layer-forming unit 580 may provide a layer of the ceramic slurry provided on the auxiliary stage 550 on the molding stage 570 of the main stage 560. The layer-forming unit 580 may coat the ceramic slurry on the molding stage 570 to a uniform thickness. The layer-forming unit 580 may be horizontally moved above the molding stage 570 of the main stage 560 in a direction crossing the molding stage 570.

Figure 5B:
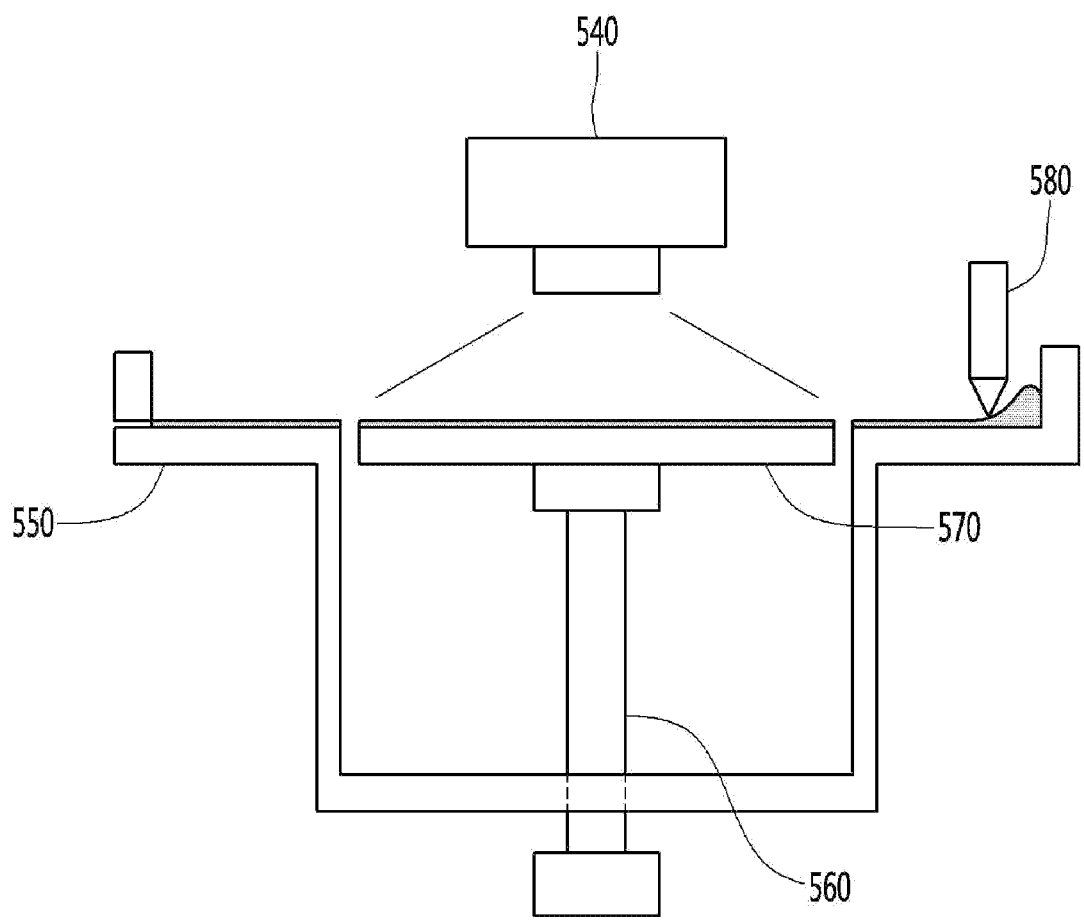

Referring to FIG. 5B, according to the method of manufacturing a ceramic microfluidic reactor using a photocuring 3D printer, a ceramic slurry including surface-treated ceramic particles and a photocurable binder may be provided in a layer by horizontally moving the layer-forming unit 580 in a direction crossing the auxiliary stage 580 on the molding stage 570. In addition, according to the method of manufacturing a ceramic microfluidic reactor using a photocuring 3D printer, one layer of a microfluidic reactor structure 60 may be formed by curing the layer of ceramic slurry by applying light onto the ceramic slurry on the molding stage 570 from the light source 540.

The light source 540 applies light only to a specific part of the molding stage 570. One layer of the microfluid reactor structure 60 may be formed by curing the specific part of the light-applied layer of ceramic slurry.

Meanwhile, during the application of light from the light source 540, the layer-forming unit 580 may be spaced away from the molding stage 570 so that light applied from the light source 540 is not reflected or scattered.

Figure 5C:
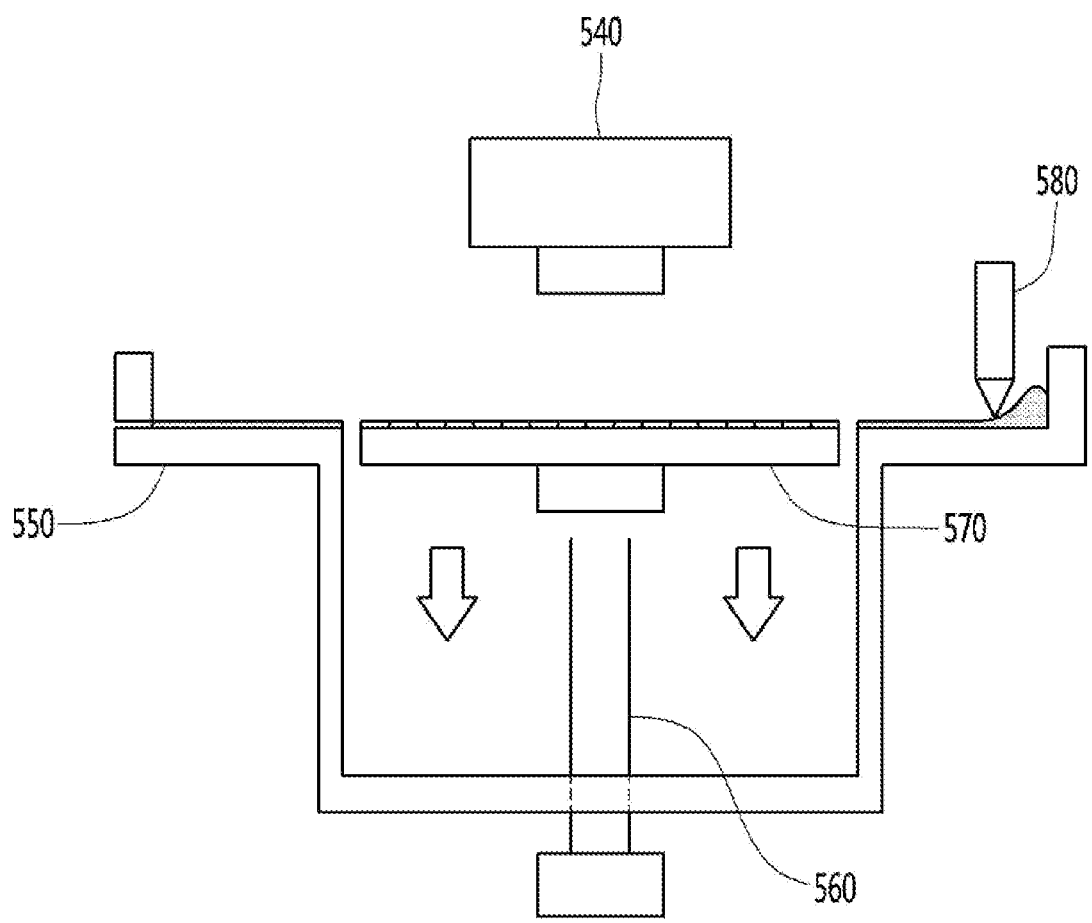

Referring to FIG. 5C, to laminate a layer of ceramic slurry on one layer of the microfluidic reactor structure 60, after the ceramic slurry has been cured, the molding stage 570 may descend by a length corresponding to the total height of the cured layer.

Afterward, the layer-forming unit 580 moving from one region to another region of the auxiliary stage 550 may move again to a first region of the auxiliary stage 550. In this case, the ceramic slurry accumulated in a second region of the auxiliary stage 550 may be applied to the molding stage 570 from the second region of the auxiliary stage 550 by the layer forming unit 580, and a ceramic slurry may be additionally provided on one layer of the microfluidic reactor structure 60 formed by curing.

Subsequently, as shown in FIG. 5B, another layer of the microfluidic reactor structure 60 may be formed by applying light to the additionally provided ceramic slurry using the light source 540.

Figure 5D:
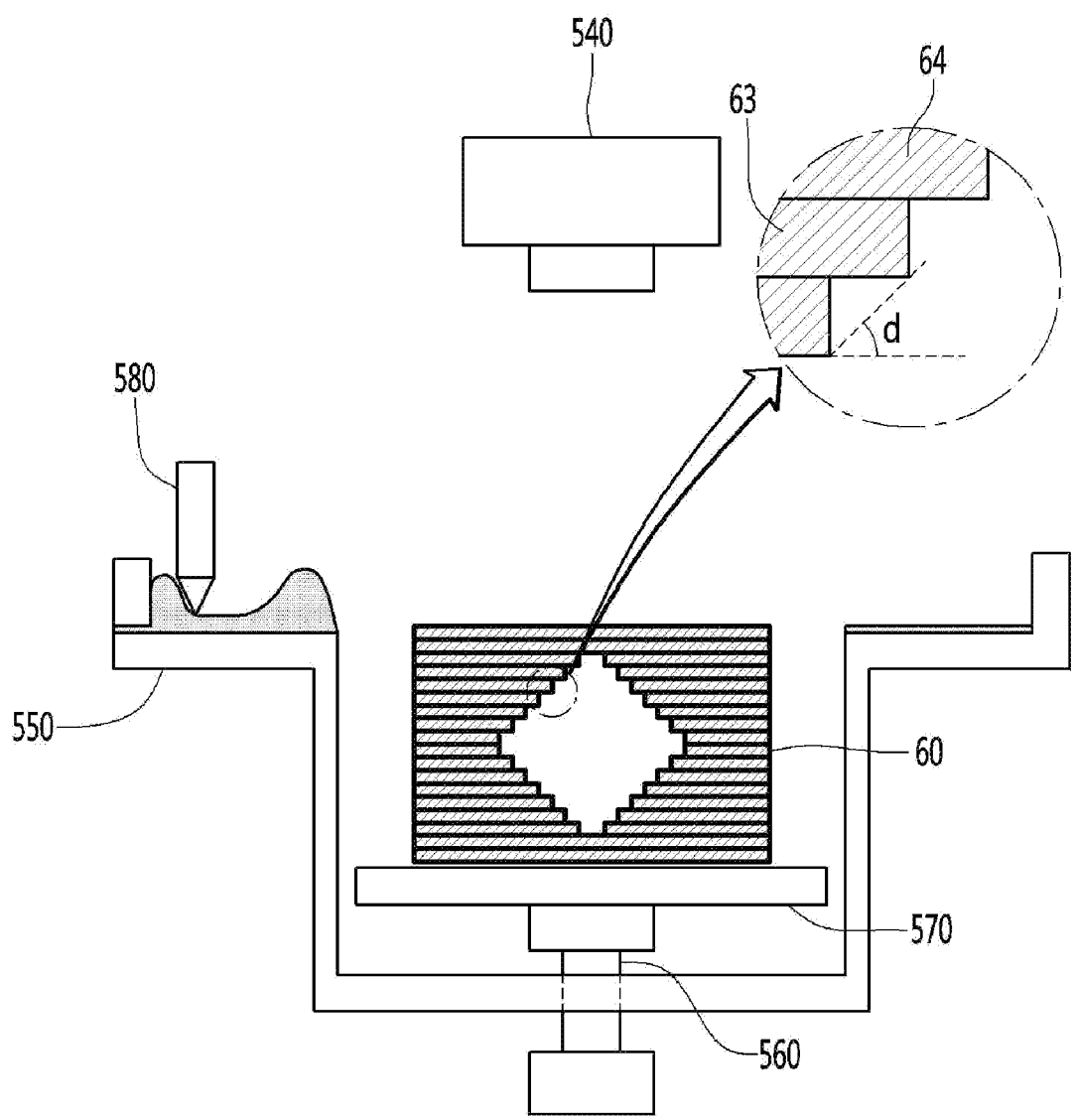

Referring to FIG. 5D, the procedures of FIGS. 5A to 5C may be repeated until the microfluidic reactor structure 60 is formed. Specifically, according to the method of manufacturing a ceramic microfluidic reactor using a photocuring 3D printer, a layer of ceramic slurry is provided on the molding stage 570 of the main stage 560 using the layer-forming unit 580, a layer of the microfluidic reactor structure 60 is formed by curing the ceramic slurry by applying light to the layer of ceramic slurry using the light source 540, and the molding stage 570 may descend by a length corresponding to the height of the formed layer. The microfluidic reactor structure 60 may be formed by laminating layers of the microfluidic reactor structure 60 by repeating the above-described procedures.

The method of manufacturing a ceramic microfluidic reactor according to another embodiment of the present invention is characterized by forming layers of the microfluidic reactor structure 60 so that the angle between the ground and the line connecting the lower vertex of one layer 63 and the lower vertex of another layer 64 formed thereon is 45° or more. In this case, a drooping phenomenon of the upper layer 64 by gravity may be minimized, and the deformation of the microchannel may be minimized.

Specifically, in FIG. 5D, based on the central point of the inner tube of the microfluidic reactor structure 60, the upper portion is configured to have a wider area of a layer as goes upwards. That is, the area of the upper layer 64 is wider than that of the lower layer 63. In this case, a part of the upper layer 64 may not be in contact with the lower layer 63, and may be configured to float in the air without being supported by the lower layer 63. In this case, since the part supported by the lower layer 63 is supported by the lower layer 63, a drooping phenomenon does not occur even by gravity, the part not supported by the lower layer 63 droops due to gravity. Although each of the layers 63 and 64 corresponds to cured layers, since gravity continuously acts during curing, an uncured ceramic slurry slightly droops, and the above-described drooping phenomenon may occur.

However, according to the method of manufacturing a microfluidic reactor according to another embodiment of the present invention, when the angle between the ground and the line connecting the lower vertex of one layer 63 and the lower vertex of another layer 64 formed thereon is 45° or more, the lower vertex of the upper layer 64 may be disposed close to the upper vertex of the underlying layer 63. In this case, even when a part of the upper layer 64 is not supported by the lower layer 63, the area of the part may be sufficiently small. Therefore, although gravity acts on a part of the upper layer 64, the drooping of the part of the upper layer 64 may be minimized, and a problem of the ceiling part (that is, the upper portion) of the microchannel drooping during lamination may be minimized.

Particularly, as shown in FIG. 4B, when the shape of the cross-section 52B of the microchannel 51B of the microfluidic reactor 50 of the present invention is a parallelogram in which the opposite angles on the left side a1 and the right side a2 are more than 90°, and the opposite angles of the top aide b1 and the bottom side b2 are less than 90°, and the shape of the cross-section 51A of the microchannel 51A is a rhombus, the angle between the group and the line connecting the lower vertex of one layer of each of the microchannel 51A or 51B and the lower vertex of another layer formed thereon is 45° or more. Therefore, in this case, the above-described drooping problem may be minimized, and the microchannels 51A and 51B with sophisticated shapes may be printed.

In addition, according to the method of manufacturing a microfluidic reactor according to another embodiment of the present invention, a microfluidic reactor may be manufactured using a top-down photocuring 3D printer. The top-down method of the photocuring 3D printer may form a ceramic microfluidic reactor structure 60 by forming one layer of the structure by directly applying light to the ceramic slurry provided in a layer on the molding stage, and laminating layers in the same manner as described above. In this case, as the formation of the layers of the microfluidic reactor is performed sequentially from the bottom to the top, light interference caused by the upper layer may be minimized, and thus it is possible to easily print a more sophisticated structure.

Figure 6:
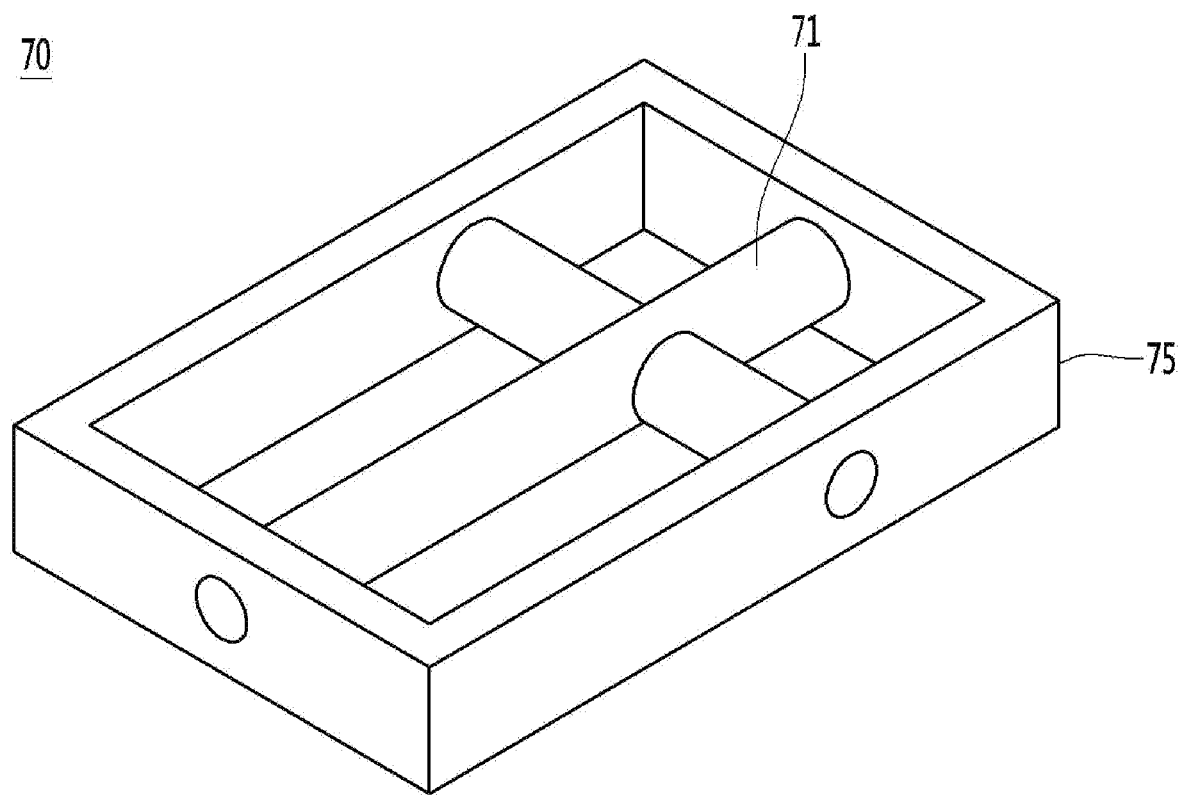
FIG. 6 shows a ceramic microfluidic reactor according to still another embodiment of the present invention.

FIG. 6 shows a ceramic microfluidic reactor 70 according to still another embodiment of the present invention.

Referring to FIG. 6, the microfluidic reactor 70 may further include a partition wall 75 which is connected with the outer wall of a microchannel 71, and disposed in a region corresponding to the edges of the microfluidic reactor 70.

When a layer of ceramic slurry is provided using a layer-forming unit in a method of manufacturing the microfluidic reactor 70 using photocuring 3D printing, the partition wall 75 may be configured to prevent a phenomenon in which the ceramic slurry is concentrated to one side.

Specifically, as shown in FIGS. 5A to 5D, when a layer of ceramic slurry is provided on the molding stage 570 of the main stage 560 using the layer-forming unit 580, the layer-forming unit 580 may horizontally move in a direction crossing the molding stage 570 from the auxiliary stage 550. In this case, the ceramic slurry applied on the molding stage 570 may not be applied to a uniform thickness due to a frictional force with the layer-forming unit 580 and applied to one side. In this case, since the heights of the laminated layers are not uniform, it may be difficult to form a precise structure.

However, the microfluidic reactor 70 according to still another embodiment of the present invention may include the partition wall 75 surrounding the edges of the microfluidic reactor 70, and a problem of concentrating the ceramic slurry to one side may be inhibited due to the partition wall 75. Specifically, in the procedure of providing a layer of ceramic slurry by the layer-forming unit 580, one side of the partition wall 75 may be in contact with the layer-forming unit 580, and may serve as a dam structure inhibiting the concentration of the ceramic slurry to one side. Therefore, the ceramic slurry may be applied to a uniform thickness as a whole.

The thickness of the partition wall 75 may be 0.2 to 2 mm. When the thickness of the partition wall 75 is less than 0.2 mm, the partition wall 75 may not properly serve as a dam structure, and the concentration of the ceramic slurry to one side may not be sufficiently inhibited. In addition, when the thickness of the partition wall 75 is more than 2 mm, the ceramic slurry may be concentrated to one side of the partition wall 75 so that a layer of the microchannel 71 may not be formed to a sufficient thickness.

Figure 7A:
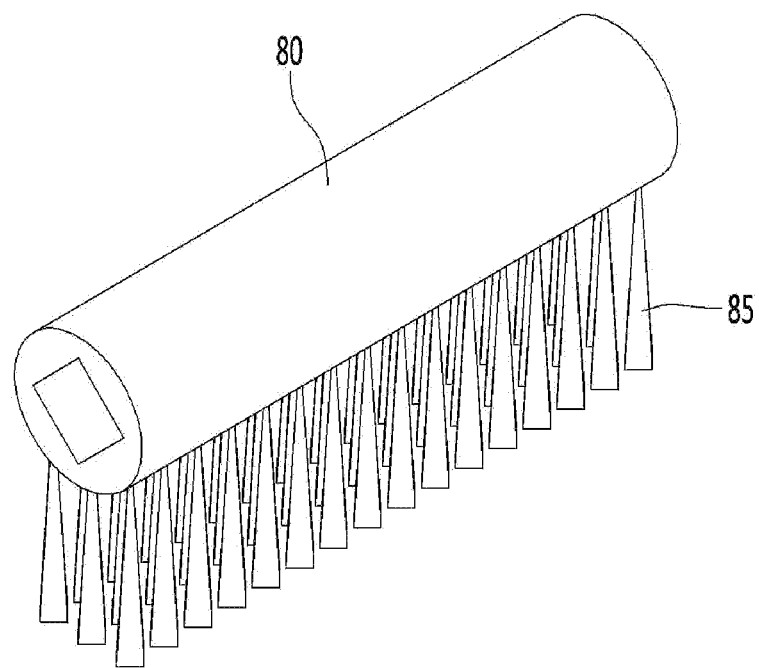
FIGS. 7A and 7B show supports formed around microfluidic reactor structures manufactured by the methods of manufacturing a ceramic microfluidic reactor using a photocuring 3D printer according to embodiments of the present invention.
Figure 7B:
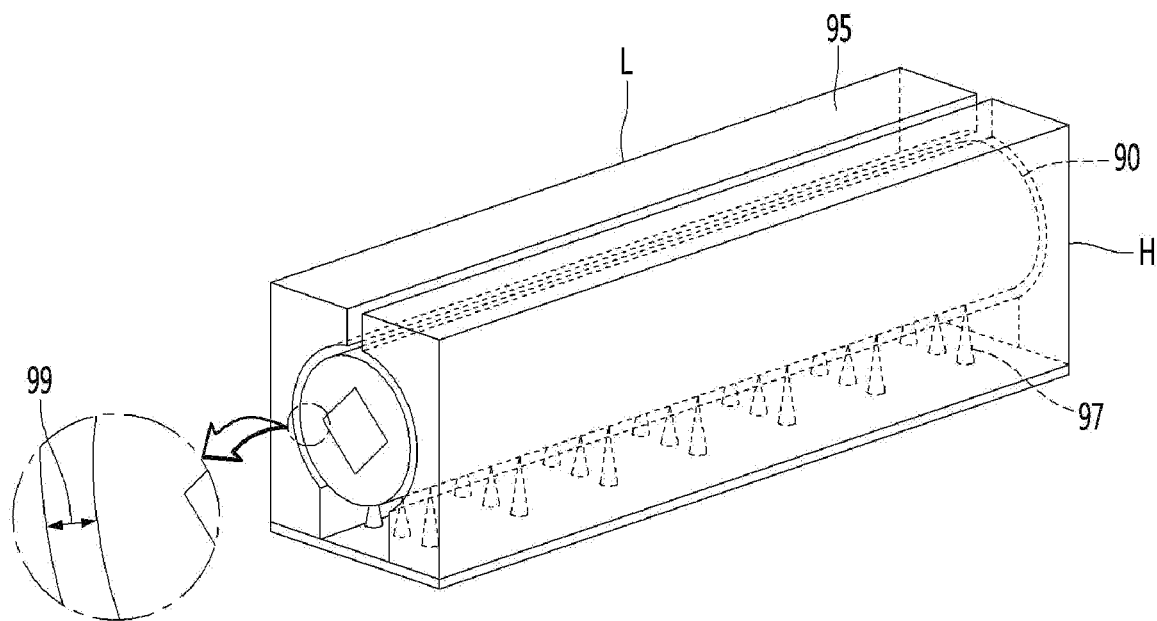

FIGS. 7A and 7B show supports formed around microchannels 80 and 90 manufactured by the methods of manufacturing a ceramic microfluidic reactor using a photocuring 3D printer according to embodiments of the present invention.

Referring to FIGS. 7A and 7B, when the microchannels 80 and 90 are printed by photocuring 3D printing, supports 85 and 97 and a surrounding support 95 may be printed together to stably support the microchannels 80 and 90.

The supports 85 and 97 and the surrounding support 95 may be formed of the same material as the microchannels 80 and 90 printed by photocuring 3D printing.

The supports 85 and 97 and the surrounding support 95 are temporary structures for supporting the microchannels 80 and 90, and they may be easily removed before the process of removing the polymer of the microchannels 80 and 90.

Specifically, when the microchannels 80 and 90 are formed by curing the ceramic slurry by applying light to a region corresponding to the outer wall of the microchannel 80 or 90 using a photocuring 3D printer, the supports 85 and 97 supporting the lower parts of the outer walls of the microchannels 80 and 90 may be respectively formed together, and the surrounding support 95 surrounding the outer wall of the microchannel 90 may also be formed. Subsequently, the supports 85 and 97 and the surrounding support 95 may be removed from the microchannels 80 and 90, and while the supports 85 and 97 and the surrounding support 95 are removed, a part of the polymer may be removed from the microchannels 80 and 90, and the microchannels 80 and 90 may be sintered.

Hereinafter, the supports 85 and 97 and the surrounding support 95 will be described with reference to FIGS. 7A and 7B.

Referring to FIG. 7A, a support 85 is formed in a tip shape which has a wider bottom surface and tapers to the top surface like a pyramid, and may be in contact with the lower part of the outer wall of the microchannel 80 printed using photocuring 3D printing.

In this case, as shown in FIG. 7A, the support 85 may be formed under the outer wall of the microchannel 80. Specifically, when the outer wall of the microchannel 80 printed using photocuring 3D printing is formed in a round shape, the support 85 may be formed under the outer wall of the microchannel 80 to be in contact with the outer surface of the outer wall of the microchannel 80.

When a microfluidic reactor structure is manufactured using a ceramic slurry, the shape of the microchannel 80 may not droop or collapse due to the support 85 formed under the outer wall of the microchannel 80. Specifically, when the outer wall of the microchannel 80 is formed in a round shape, according to the same principle as described with reference to FIGS. 4A to 5D, the same drooping problem microchannel 80 may also occur at the lower part of the outer wall of the microchannel 80. That is, among the layers corresponding to the lower part of the outer wall of the microchannel 80, the area of an upper layer is wider than that of an underlying layer, and a part of the upper layer may not be supported by the underlying layer. In this case, a part of the upper layer may droop, and the shape of the lower part of the outer wall of the microchannel 80 may be changed.

However, since there is the support 85 under the microchannel 80 according to still another embodiment of the present invention, the drooping problem occurring at the lower part of the outer wall of the microchannel 80 in the formation of the microchannel 80 may be minimized.

Meanwhile, as shown in FIG. 7B, the support 97 may be formed under the outer wall of the microchannel 90, and the surrounding support 95 surrounding the outer wall of the microchannel 90 and spaced apart from the outer wall thereof may be formed.

The support 97 is formed of the same component as the support 85 of FIG. 7A, is formed under the outer wall of the microchannel 90 and configured to support the lower part of the outer wall of the microchannel 90, and minimize the drooping problem occurring at the lower part of the outer wall thereof.

The surrounding support 95 is a support surrounding the outer wall of the microchannel 90, and may be, as shown in FIG. 7B, formed in a hexagonal shape as a whole. The surrounding support 95 is formed to have predetermined length (L), height (H) and thickness.

The length L of the surrounding support 95 may be the same or larger than that of the microchannel 90.

The height of the surrounding support 95 may be larger than or the same as the middle of the height of the microchannel 90. Preferably, the height H of the surrounding support 95 may be larger than the height (that is, diameter) of the microchannel 90.

The thickness of the surrounding support 95 may be larger than or the same as that of the microchannel 90.

When the length L of the surrounding support 95 is smaller than that of the microchannel 90, the height H of the surrounding support 95 is smaller than the middle of the height of the microchannel 90, or the thickness of the surrounding support 95 is smaller than that of the microchannel 90, when the microchannel 90 is formed using a top-down photocuring 3D printer, by the operation of a layer-forming unit, a slurry may be concentrated to one side, or the problem of detaching a lower layer of the microchannel 90 may occur. Details thereof will be described below.

The surrounding support 95 is spaced a predetermined distance apart from the outer wall of the microchannel 90. In this case, a separation distance 99 may be 0.01 to 3 mm. When the separation distance 99 is less than 0.01 mm, the outer wall of the microchannel 90 is too close to the surrounding support 95 and thus a problem of connecting the surrounding support 95 with the outer wall of the microchannel 90 may occur in the formation of the microchannel 90. When the separation distance 99 is more than 3 mm, by the operation of the layer-forming unit, a slurry may be concentrated to one side, or the problem of detaching a lower layer of the microchannel 90 may occur.

Meanwhile, as shown in FIG. 7B, the surrounding support 95 has the bottom surface on which the support 97 is disposed. In this case, the bottom surface of the surrounding support 95 may have a suitable thickness for sufficiently maintaining the rigidity of the support 97.

In some embodiments, the support 97 may be omitted. In this case, the lower part of the outer wall of the microchannel 90 may be in direct contact with the bottom surface of the surrounding support 95.

In addition, as shown in FIG. 7B, there may be a recess in a part of the outer surface of the surrounding support 95. For example, an upper recess is formed from the top surface of the surrounding support 95 to the upper part of the outer wall of the microchannel 90, and a lower recess is formed from the lower surface of the surrounding support 95 to the lower part of the outer wall of the microchannel 90. In this case, the surrounding support 95 may be divided into a left portion surrounding the left side of the microchannel 90 and a right portion surrounding the right side of the microchannel 90. However, the present invention is not limited thereto, and there may be left and right recesses in the surrounding support 95. When there is a recess in the surrounding support 95, the surrounding support 95 may be easily removed from the microchannel 90 in the procedure of removing the surrounding support 95.

Because of the formation of the surrounding support 95 and the support 97, the deformation of the microchannel 90 may be minimized in the procedure of forming the microfluidic reactor structure, and the molding precision of the microchannel 90 may be improved.

That is, since the support 97 is formed under the outer wall of the microchannel 90 to support the lower part of the outer wall of the microchannel 90, a phenomenon in which a ceramic slurry sags by gravity in the procedure of forming lower layers of the microchannel 90 may be inhibited, and the deformation of the lower part of the outer wall of the microchannel 90 may be minimized.

In addition, since the surrounding support 95 is formed to surround the outer wall of the microchannel 90, when the microchannel 90 is formed using a top-down photocuring 3D printer, the problem of ceramic slurry sagging to one side due to a layer-forming unit may be minimized. Specifically, as shown in FIG. 6, a step difference may occur between the cured layer and an auxiliary stage due to process errors of the top-down photocuring 3D printer. In this case, in the procedure of providing a ceramic slurry, due to the step difference, curvature may occur on the ceramic slurry, and the layer of the microchannel 90 may be formed in a curved shape by curing the curved ceramic slurry. However, when the surrounding support 95 is present, the surrounding support 95 is present to be in contact with the outer wall of the microchannel 90, and thus the layers of the surrounding support 95 may serve as a buffering part compensating for the step difference. Therefore, the curvature of the ceramic slurry may be minimized, and the layer of the microchannel 90 may be formed flat.

Meanwhile, as described above, the surrounding support 95 is spaced a separation distance 99 very close to the outer wall of the microchannel 90, and thus the support 97 supporting the lower part of the outer wall of the microchannel 90 may be omitted or the number of the supports 97 may be significantly reduced.

Specifically, when there is a support 97 supporting the lower part of the outer wall of the microchannel 90, the lower part of the outer wall of the microchannel 90 is in contact with the support 97. In this case, in the procedure of providing a layer of ceramic slurry using the layer-forming unit, the problem of detaching lower layers of the outer wall may occur due to surface tension. That is, the top-down photocuring 3D printer forms a microfluidic reactor structure with a high viscosity ceramic slurry of 5000 cp or more. The high viscosity ceramic slurry has high surface tension, and in the procedure of providing the ceramic slurry by the layer-forming unit, due to the high surface tension of the ceramic slurry, shear stress is applied to the layers in contact with the ceramic slurry. In some cases, due to the high surface tension of the ceramic slurry, some layers may be detached. Particularly, since the areas of lower layers of the outer wall of the microchannel 90 are increased from the bottom to the top, the contact area between the layers is small. Therefore, due to the shear stress provided by the layer-forming unit and the high viscosity ceramic slurry, the problem of detaching the upper most layer may occur. To inhibit this problem, the lower layers of the outer wall of the microchannel 90 may be in contact with a sufficient number of the supports 97, and the contact areas between the support 97 and the lower layers of the outer wall have to be large enough.

However, when there is a surrounding support 95, the surrounding support 95 is spaced a sufficiently close distance apart from the outer wall of the microchannel 90, the surrounding support 95 may inhibit the detachment phenomenon of the lower layers of the outer wall of the microchannel 90. That is, since the shear stress generated by the layer-forming unit and a high viscosity ceramic slurry is dispersed by disposing the surrounding support 95 to be close to the layers of the outer wall of the microchannel 90, the shear stress acting on the lower layers of the outer wall of the microchannel 90 may be reduced. Therefore, the number of the supports 97 which have to be in contact with the lower layers of the outer wall of the microchannel 90 may be reduced, and the contact areas between the supports 97 and the lower layers of the outer wall of the microchannel 90 may also be reduced. In this case, it may be easy to remove the supports 97 from the outer wall of the microchannel 90, and in the procedure of removing the support 97 from the microchannel 90, the size of a part of the support 97 that may remain on the surface of the microchannel 90 may be reduced, and therefore the printing quality of the microfluidic reactor structure may be further improved.

In some embodiments, the support 97 may be omitted, and a part of the lower part of the outer wall of the microchannel 90 may be in direct contact with a molding stage, or in contact with the bottom surface of the surrounding support 95. In this case, the procedure of removing the support 97 from the microchannel 90 is not needed, and the problem of leaving the support 97 on the surface of the microchannel 90 during the procedure of removing the support 97 may not occur, and therefore the output quality of the microfluidic reactor structure may be further improved.

As described above, in the method of manufacturing a microfluidic reactor according to embodiments of the present invention, the supports 85 and 97 and the surrounding support 95, which support the lower part of the microchannel 80 or surround the microchannel 90 in the formation of the microfluidic reactor, are formed together. The supports 85 and 97 and the surrounding support 95 may inhibit the drooping of the lower parts of the microchannels 80 and 90, and the problem of concentrating ceramic slurry to one side and the problem of detaching a lower layer of the microchannel, which occur in the procedures of forming the microchannels 80 and 90, may be inhibited. As a result, the microchannels 80 and 90 may be more precisely printed, and the printing precision of a microfluidic reactor may be further improved.

It should be understood by those of ordinary skill in the an that the above description of the present invention is exemplary, and the exemplary embodiments disclosed herein can be easily modified into other specific forms without departing from the technical spirit or essential features of the present invention. Therefore, the exemplary embodiments described above should be interpreted as illustrative and not limited in any aspect. For example, each component described as a single unit may be implemented in a distributed manner, and components described as being distributed may also be implemented in combined form.

It should be interpreted that the scope of the present invention is defined by the appended claims rather than the detailed description, and encompasses all modifications and alterations derived from meanings, the scope and equivalents of the appended claims.

INDUSTRIAL APPLICABILITY

A ceramic microfluidic reactor and a method of manufacturing the same according to embodiments of the present invention may be used in various manufacturing industries. Specifically, pharmaceutical raw materials (API), cosmetic raw materials, and various chemical raw materials may be easily synthesized through chemical reactions induced in extreme environments using a ceramic microfluidic reactor with excellent high temperature stability, chemical resistance and corrosion resistance. In addition, various chemical raw materials can be synthesized by combining or connecting a plurality of microfluidic reactors in a module form. Particularly, it is possible to manufacture customized microfluidic reactors through photocuring 3D printing, and various products such as consumer-specific pharmaceuticals, cosmetics and foods may be manufactured using the customized microfluidic reactors.

The invention claimed is:

1. A ceramic microfluidic reactor which comprises a microchannel capable of accommodating and moving microfluids, and consists of a ceramic material,
    wherein a cross-section of an inner tube of the microchannel is formed in a parallelogram shape or rhombus shape, and opposite angles on left and right sides of the cross-section of the inner tube are greater than or equal to 90°.
2. The reactor of claim 1, wherein the microchannel is formed in a pipe shape, and has an outer wall thickness of 0.2 to 10 mm.
3. The reactor of claim 1, further comprising a partition wall which is connected to the outer wall of the microchannel and disposed in a region corresponding to the edges of the ceramic microfluidic reactor.
4. The reactor of claim 1, wherein the cross-section of the inner tube of the microchannel is formed in a rhombus shape.

* * * * *